US007873917B2

(12) United States Patent
Larsen et al.

(10) Patent No.: US 7,873,917 B2
(45) Date of Patent: Jan. 18, 2011

(54) LOCKING RELATIONSHIPS AMONG PARAMETERS IN COMPUTER PROGRAMS

(75) Inventors: Eric Larsen, Clackamas, OR (US); Ron Brinkmann, Hermosa Beach, CA (US); Dan Candela, Beverly Hills, CA (US)

(73) Assignee: Apple Inc., Cupertino, CA (US)

( * ) Notice: Subject to any disclaimer, the term of this patent is extended or adjusted under 35 U.S.C. 154(b) by 350 days.

(21) Appl. No.: 11/271,081

(22) Filed: Nov. 11, 2005

(65) Prior Publication Data

US 2007/0113183 A1 May 17, 2007

(51) Int. Cl.
*G06F 3/048* (2006.01)
(52) U.S. Cl. ................ 715/833; 715/722; 715/723; 715/719; 345/586; 345/594; 345/650
(58) Field of Classification Search ........... 715/722, 715/723, 833, 719, 727, 730, 731, 732, 747, 715/716, 720, 726, 764, 765, 771, 784, 808, 715/835, 973, 974; 345/694, 601, 602, 594, 345/593, 581–588, 619, 643, 650, 661, 676, 345/473, 474
See application file for complete search history.

(56) References Cited

U.S. PATENT DOCUMENTS

| 6,850,254 | B1 * | 2/2005 | Banning et al. ............. 715/784 |
| 7,039,876 | B2 * | 5/2006 | Lavendel et al. ............ 715/777 |
| 2003/0039408 | A1 * | 2/2003 | Smith ........................ 382/298 |
| 2004/0066396 | A1 * | 4/2004 | Hatakenaka ................. 345/716 |
| 2006/0066628 | A1 * | 3/2006 | Brodie et al. ................ 345/594 |

\* cited by examiner

*Primary Examiner*—Weilun Lo
*Assistant Examiner*—Rashedul Hassan
(74) *Attorney, Agent, or Firm*—Adeli & Tolen LLP

(57) ABSTRACT

Some embodiments provide a method for locking in a mathematical relationship between a set of at least two parameters in a computer program. The method selects a first parameter. The method defines a mathematical relationship that ties the value of the first parameter to the value of a second parameter. In some embodiments, the mathematical relationship can be a mathematical function, a Boolean function, or a lookup table. The relationship could be directly entered by the user, or the computer program itself could derive it from the user's actions. In some embodiments, the first parameter can be locked to the mathematical relationship. The lock prevents the value of that parameter from being changed, except by changing the value of the second parameter. Some embodiments implement this method by using a GUI with an intuitive set of controls.

23 Claims, 19 Drawing Sheets

LOCKING RELATIONSHIPS AMONG PARAMETERS IN COMPUTER PROGRAMS

BACKGROUND OF THE INVENTION

Many computer applications and operating systems have user adjustable parameters. These parameters are often adjustable without regard to other parameters. They can be adjusted despite the fact that an adjustment to one parameter may make an adjustment to a second parameter desirable or necessary.

For instance, a Graphical User Interface ("GUI") may allow a user to make adjustments to large numbers of parameters. These could include locations, timing, orientations, colors and effects. The user may set each parameter independently. This could take a great deal of time.

In existing computer programs, often a change in the value of one parameter makes it necessary to change the values of several other parameters. The user of such a program may find that a particular relationship between two or more values (e.g. the values of speed and blur effect) is optimum. The difficulty arises when the user later needs to change one of the variables. For instance, the user might change the value of the first variable, (e.g. speed), and this change would destroy the optimum relationship between the first variable and the second variable (e.g. blur effect). The user would then have to change the second variable to compensate. Thus, every change in one variable requires the user to go back and change the other accordingly.

The problem becomes even worse when more than two variables are related to each other. For example, in a video compositing application, the optimum blur effect and the optimum virtual camera position may both depend on speed. In such a case, a change in blur effect necessary. The change in speed would also make a change in virtual camera position necessary. So, in this example, the users must change three separate parameters in order to implement a decision to change the speed.

Most computer application do not provide a good set of tools for maintaining optimum relationships among parameters. Thus, there is a need for a method of locking in relationships between two or more parameters of a computer operating system or application. There is also a need for a GUI to allow a user to practice the method in an intuitive manner. Ideally, such a GUI will enable the user to quickly and easily adjust multiple parameters.

BRIEF SUMMARY OF THE INVENTION

Some embodiments provide a method for locking in a mathematical relationship between a set of at least two parameters in a computer program. The method selects a first parameter. The method defines a mathematical relationship that ties the value of the first parameter to the value of a second parameter. In some embodiments, the mathematical relationship can be a mathematical function, a Boolean function, or a lookup table. The relationship could be directly entered by the user, or the computer program itself could derive it from the user's actions. In some embodiments, the first parameter can be locked to the mathematical relationship. The lock prevents the value of that parameter from being changed, except by changing the value of the second parameter. Some embodiments implement this method by using a GUI with an intuitive set of controls.

BRIEF DESCRIPTION OF THE SEVERAL VIEWS OF THE DRAWINGS

The novel features of the invention are set forth in the appended claims. However, for purpose of explanation, several features of some embodiments of the invention are illustrated in the following figures.

DETAILED DESCRIPTION OF THE INVENTION

Figure 1:
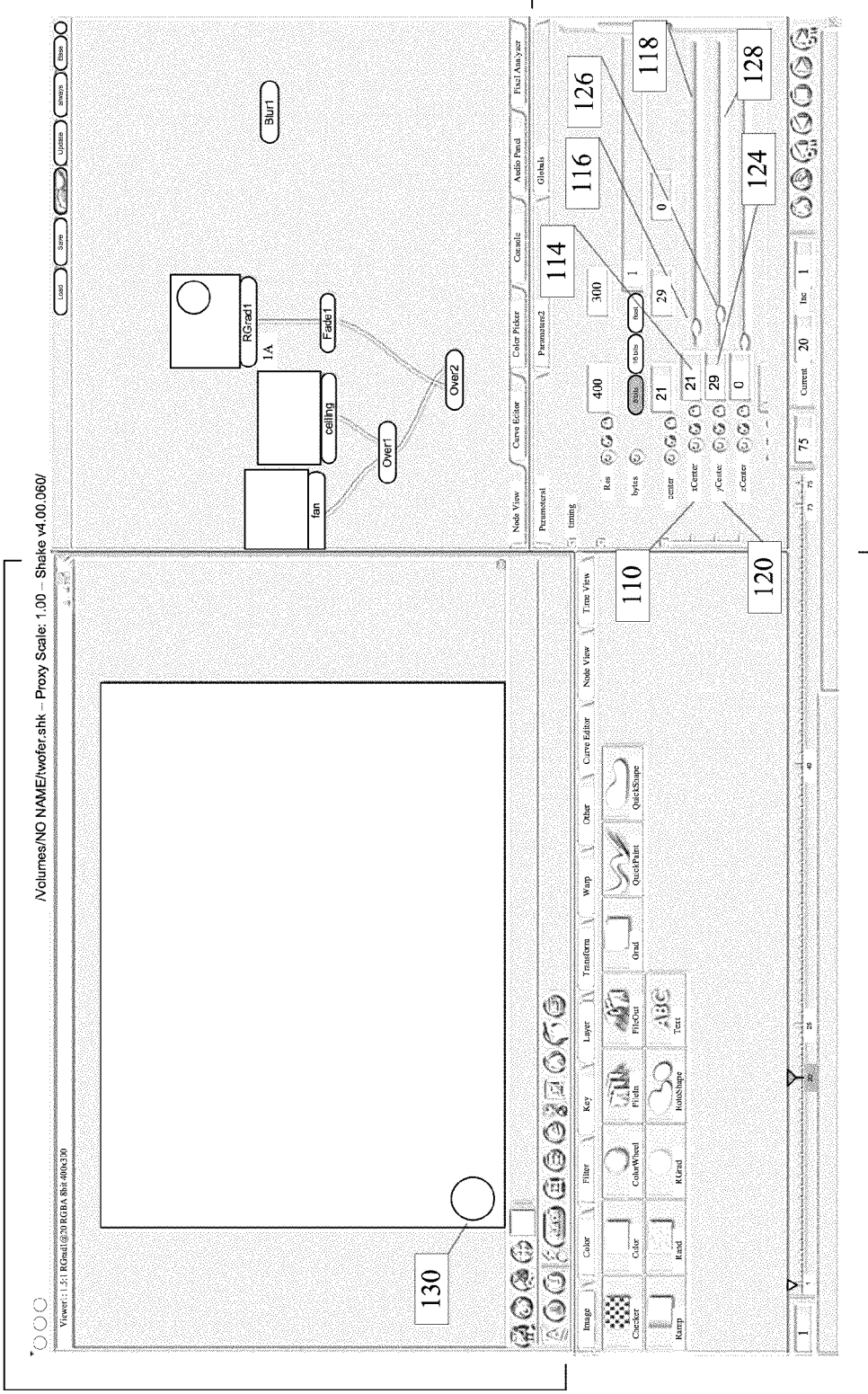
FIG. 1 illustrates an overview of a GUI of some embodiments.

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

The invention can be embodied in many different ways. The descriptions that follow merely illustrate some embodiments. For the sake of clarity, some actions taken with respect to the embodiments described below are in some chronological order. The orders in which these actions are performed are not necessarily the only orders in which such actions could be performed.

I. Overview

Some embodiments provide a method for locking in a mathematical relationship between a set of at least two parameters in a computer program. The method selects a first parameter. The method defines a mathematical relationship that ties the value of the first parameter to the value of a second parameter. The relationship could be directly entered by the user, or the computer program itself could derive it from the user's actions. In some embodiments, the first parameter can be locked to the mathematical relationship. The lock prevents the value of that parameter from being changed, except by changing the value of the second parameter.

Once a mathematical relationship is set up, and locked in, the computer program automatically makes adjustments to the value of the second adjustable parameter, in response to changes in the value of the first adjustable parameter. These adjustments maintain the mathematical relationship between the value of the first adjustable parameter and the value of the second adjustable parameter. Because the second adjustable parameter is locked, the value of that parameter is constrained to follow the mathematical formula on which it depends, and only that formula. In other words, controls that would otherwise directly change the value of the parameter have no effect while the parameter is locked.

Some embodiments implement this method by using a GUI with an intuitive set of controls. Such a GUI's intuitive controls allow a user to easily set up mathematical relationships between the values of two or more parameters and to lock parameters. The mathematical relationship makes the value of one parameter (the dependent parameter) dependent on the value of at least one other parameter (the independent parameter). Consequently, when the user changes the value of the independent parameter or parameters, the GUI changes the value of the dependent parameter in order to maintain the mathematical relationship between the parameters.

In some embodiments, most or all parameters have GUI controls associated with them (e.g. sliders, data entry boxes, etc.). Normally using a GUI control directly affects the value of its associated parameter. However, when a parameter is locked, the value of that parameter cannot be directly changed by using its associated controls.

While the direct controls are locked out, the GUI changes the value of the dependent parameter only in response to changes to the value of the independent parameter. These changes maintain the specified mathematical relationship between the parameters.

II. GUI of Video Editing Applications

FIGS. 1-18 illustrate one example of such a GUI. The pictured GUI 100 is the GUI of a video editing application. As used in this document, "video editing application" broadly and generically refers to any software application that allows the user to modify, composite, generate or otherwise edit digital images and/or video clips. It will be clear to those skilled in the art that these figures illustrate merely some possible embodiments. Those skilled in the art will understand that other embodiments could be used in any type of computer application or operating system.

The GUI 100 of the video editing application allows various visual and audio effects to be applied to video clips and individual images. The video editing application has a large number of adjustable parameters. The GUI 100 provides intuitive tools that allow the user to relate nearly any parameter to nearly any other parameter via a mathematical relationship. Some parameters that can be related to each other are: time, x-coordinate, y-coordinate, a z-coordinate, a rotation of the object about an axis, a radius of an object, a blue color setting of an object, a green color setting of an object, a red color setting of an object, an alpha of an object, a reflectivity of an object, a transparency of an object, an intensity of an object, a blur feature of an object, a speed of an object, a height of an object, a width of an object, a falloff radius of an object, an opacity of an object, a resolution of an object, an angular speed of an object, a pitch of a part of a sound file, a volume of a part of a sound file, a beat of a part of a sound file, a size of a checkerboard pattern, a brightness of the object, or the amount of warping of an object. The above list is a sample, and is not comprehensive. Various embodiments may include, but are not limited to, any, all, or none of the parameters on the list.

A. Overview of the GUI

As described above, the GUI 100 allows the user to associate the value of one parameter with the value of another, through a mathematical relationship. The GUI 100 also allows the user to lock the first parameter. Before those features are described, some general features of the GUI 100 will be described by reference to FIGS. 1-4.

FIG. 1 is a screen capture of GUI 100. This screen capture illustrates that the GUI 100 contains a parameter control area 101 and a display area 102. Display area 102 shows the effects of the video editing on a frame of video clip. Display area 102 can contain a number of objects. In this figure, display area 102 contains a single circular shape, object 130. Parameter control area 101 provides the user access to a number of parameters that affect objects in the display area 102. Each parameter shown in parameter control area 101 has multiple GUI controls that can directly affect the value of that parameter. Many of these controls also act as indicators of the value of the parameter. For example, display box 114 shows the value of a parameter, xCenter 110, and can also be used to directly enter a new value for that parameter.

In FIG. 1, Parameter control area 101 contains parameters defining object 130. Parameters in parameter control area 101 include xCenter 110, and ycenter 120. XCenter 110 and ycenter 120 determine the horizontal and vertical position, respectively, of object 130. Changing the value of xCenter 110 causes object 130 to be repositioned horizontally. Changing the value of ycenter 120 causes object 130 to be repositioned vertically.

Changes to the value of xCenter 110 and ycenter 120 can be implemented by use of their parameter controls. Several such controls are found in parameter control area 101. Controls in parameter control area 101 include display box 114, slider 116, slider track 118, display box 124, slider 126, and slider track 128.

The value of xCenter 110 can be changed by: (1) directly entering a new value or formula in display box 114, (2) clicking and dragging slider 116, (3) clicking on slider-track 118, or (4) dragging object 130 horizontally with a dragging tool (not shown).

Similarly, the value of ycenter 120 can be changed by: (1) directly entering a new value or formula in display box 124, (2) clicking and dragging slider 126, (3) clicking on slider-track 128, or (4) dragging object 130 vertically with a dragging tool (not shown).

As mentioned above, several controls in this GUI are also indicators of the value of the corresponding parameter. Indicators of xCenter 110 include display box 114, slider 116, and the horizontal position of object 130. These will hereafter be called, collectively, "xCenter indicators". Similarly, indicators of yCenter 120 include display box 124, slider 126, and the vertical position of object 130. These will hereafter be called, collectively, "yCenter indicators".

Figure 2:
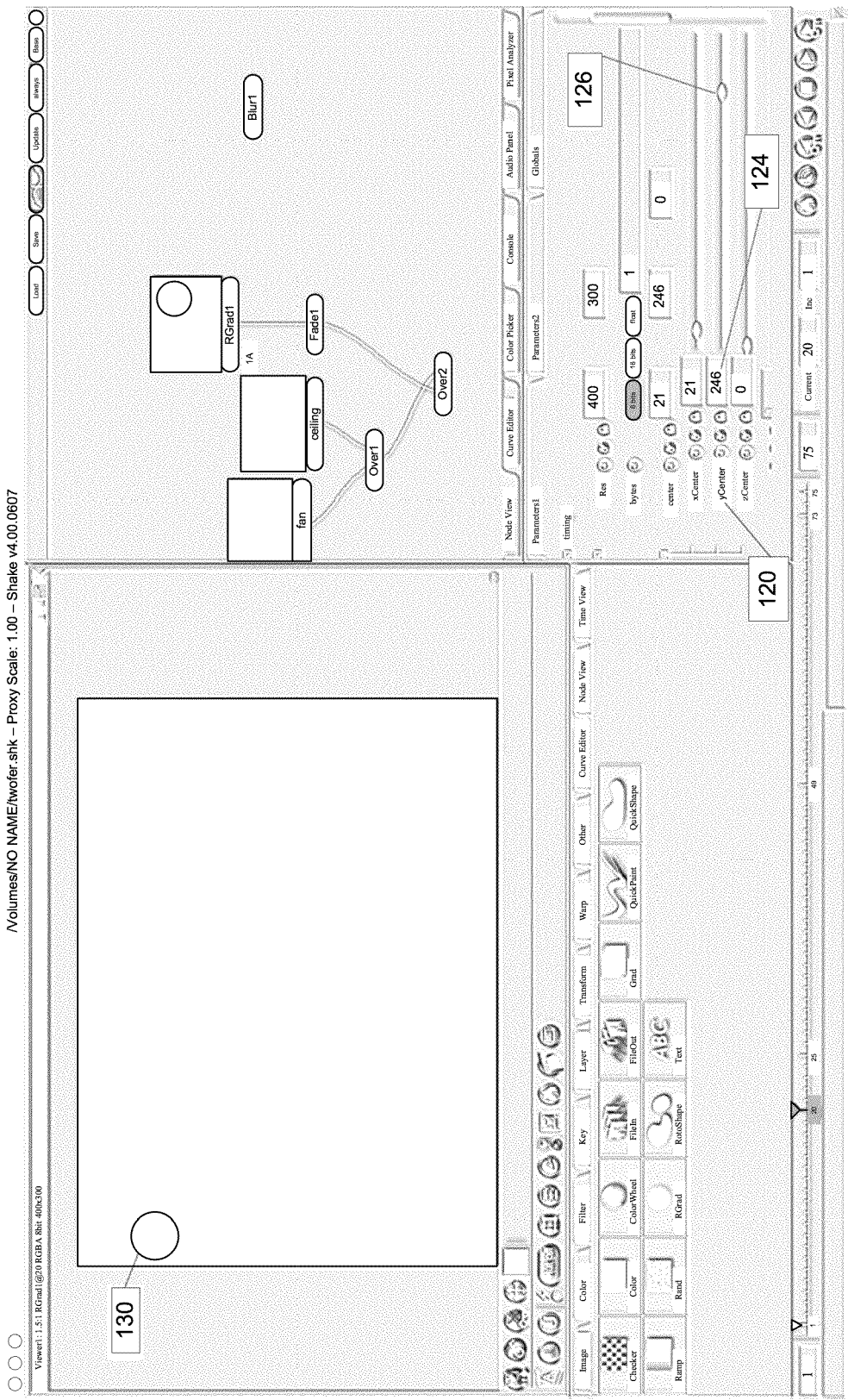
FIG. 2 illustrates the results of changing the value of a parameter by a GUI slider.

The next few figures illustrate changes, in the values of xCenter 110 and yCenter 120, caused by using various controls. FIG. 2 illustrates the results of changing the value of ycenter 120 by clicking and dragging slider 126. The ycenter indicators have changed to reflect the new value of ycenter 120.

Figure 3:
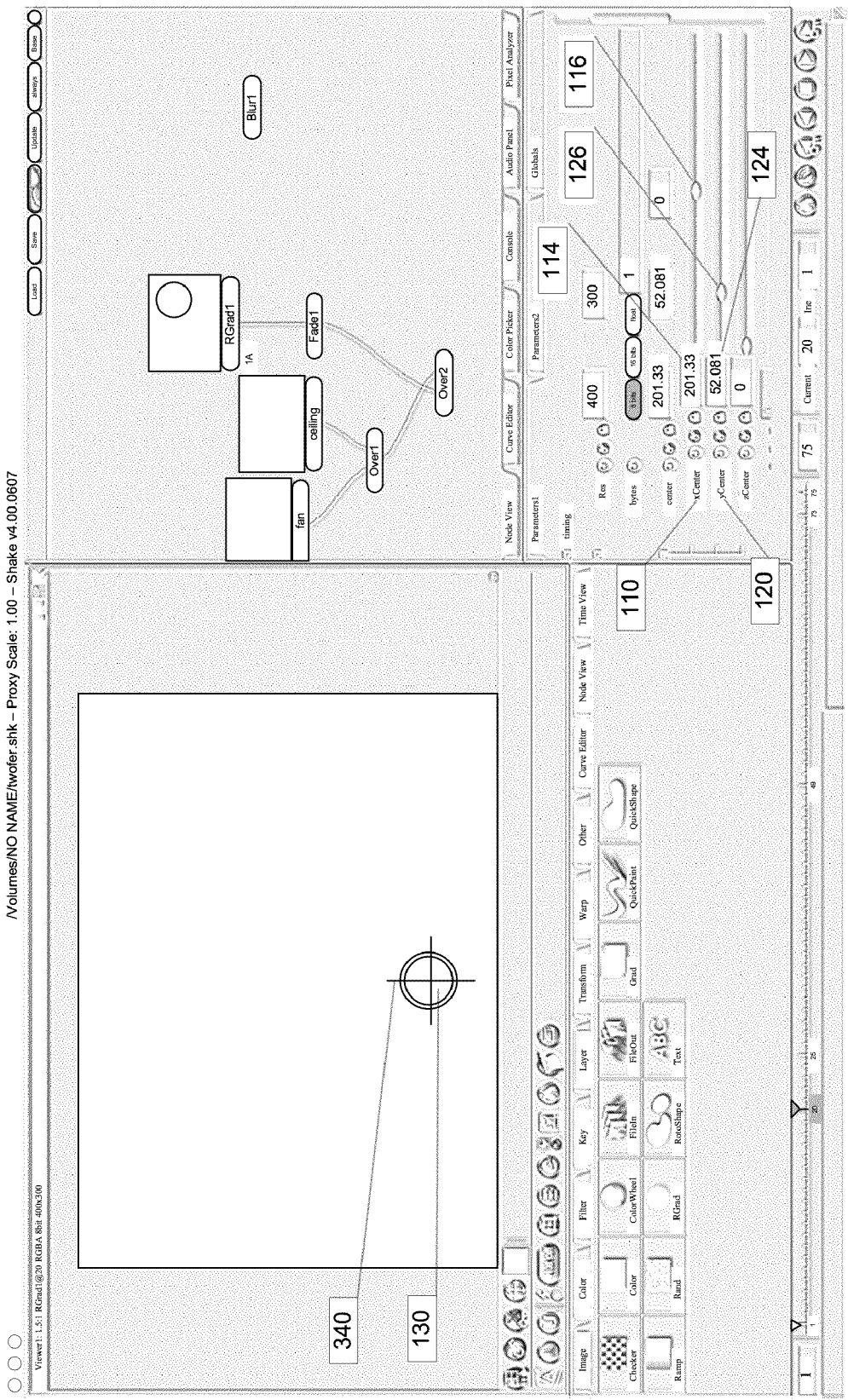
FIG. 3 illustrates the results of changing the values of two parameters by dragging an object in the GUI.

FIG. 3 illustrates the results of changing both the value of xCenter 110 and the value of ycenter 120. These changes were caused by the user clicking and dragging a dragging tool 340. The xCenter indicators have changed to reflect the new value of xCenter 110. The ycenter indicators have changed to reflect the new value of yCenter 120.

Figure 4:
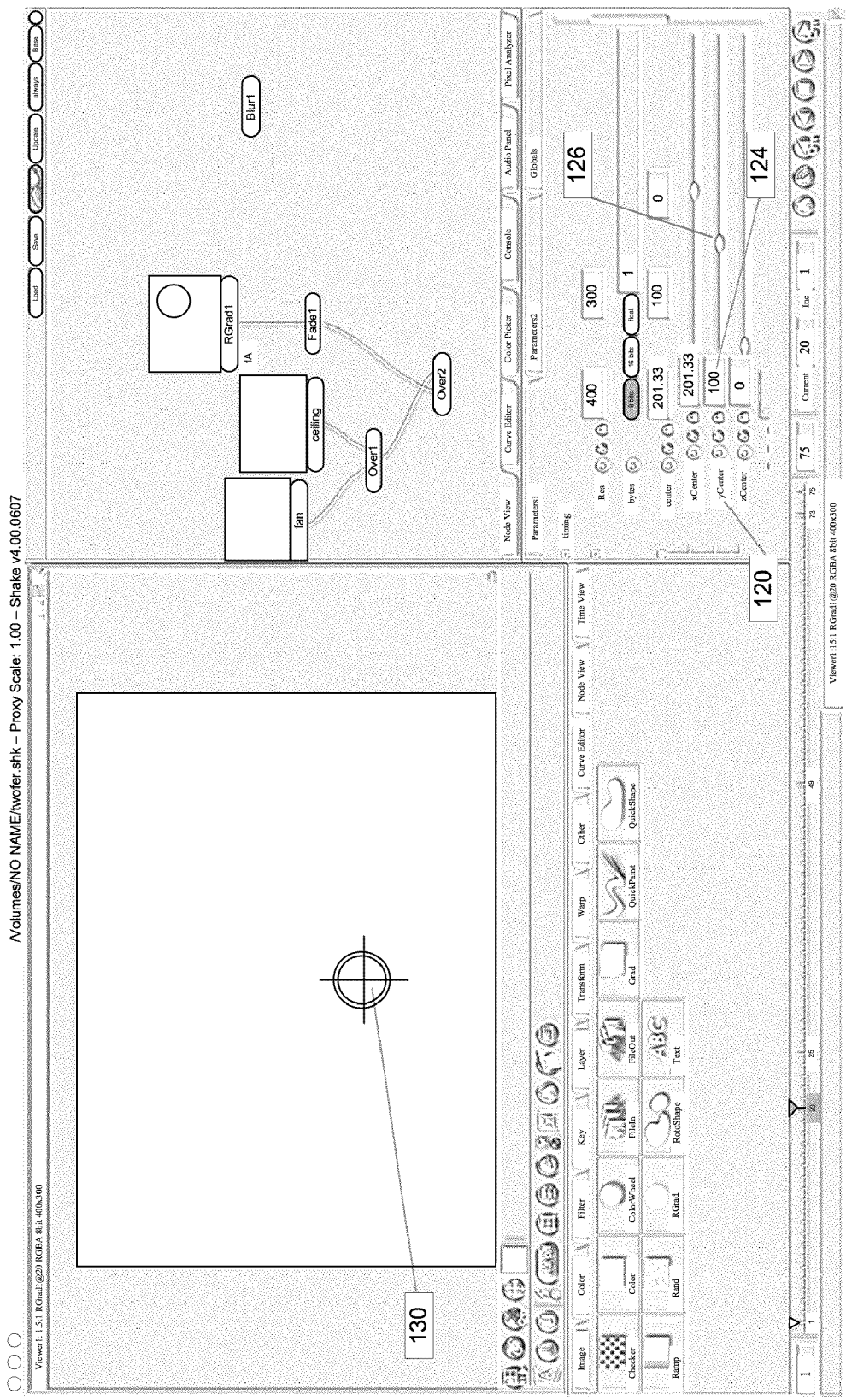
FIG. 4 illustrates the results of changing the value of a parameter by entering a new value.

FIG. 4 illustrates the results of changing the value of ycenter 120 by entering a new numerical value, specifically "100", in display box 124. The yCenter indicators have changed to reflect the new value of ycenter 120.

B. Mathematical Formulas Relating Parameters

Figure 5:
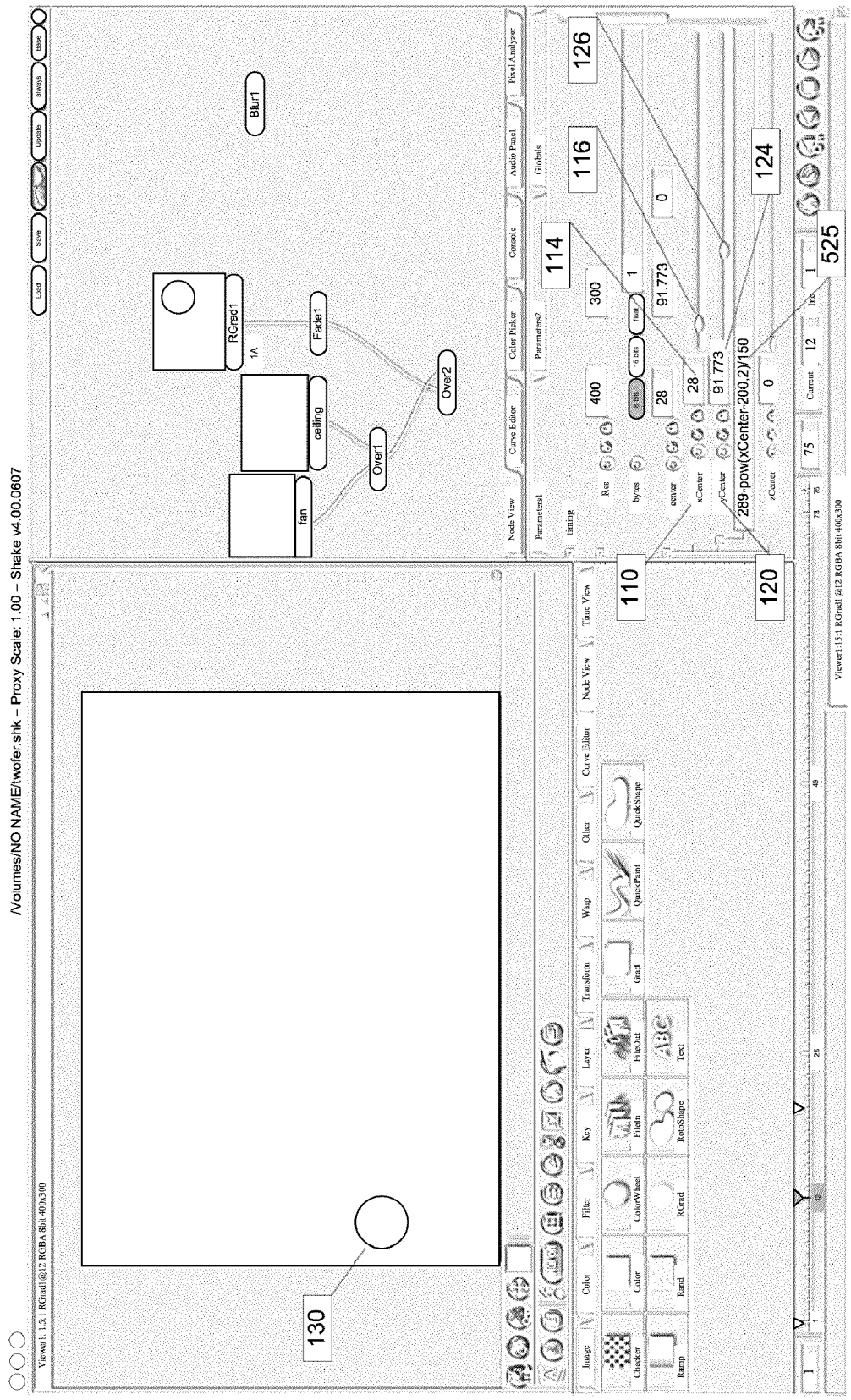
FIG. 5 illustrates the results of entering a mathematical formula for a parameter.
Figure 6:
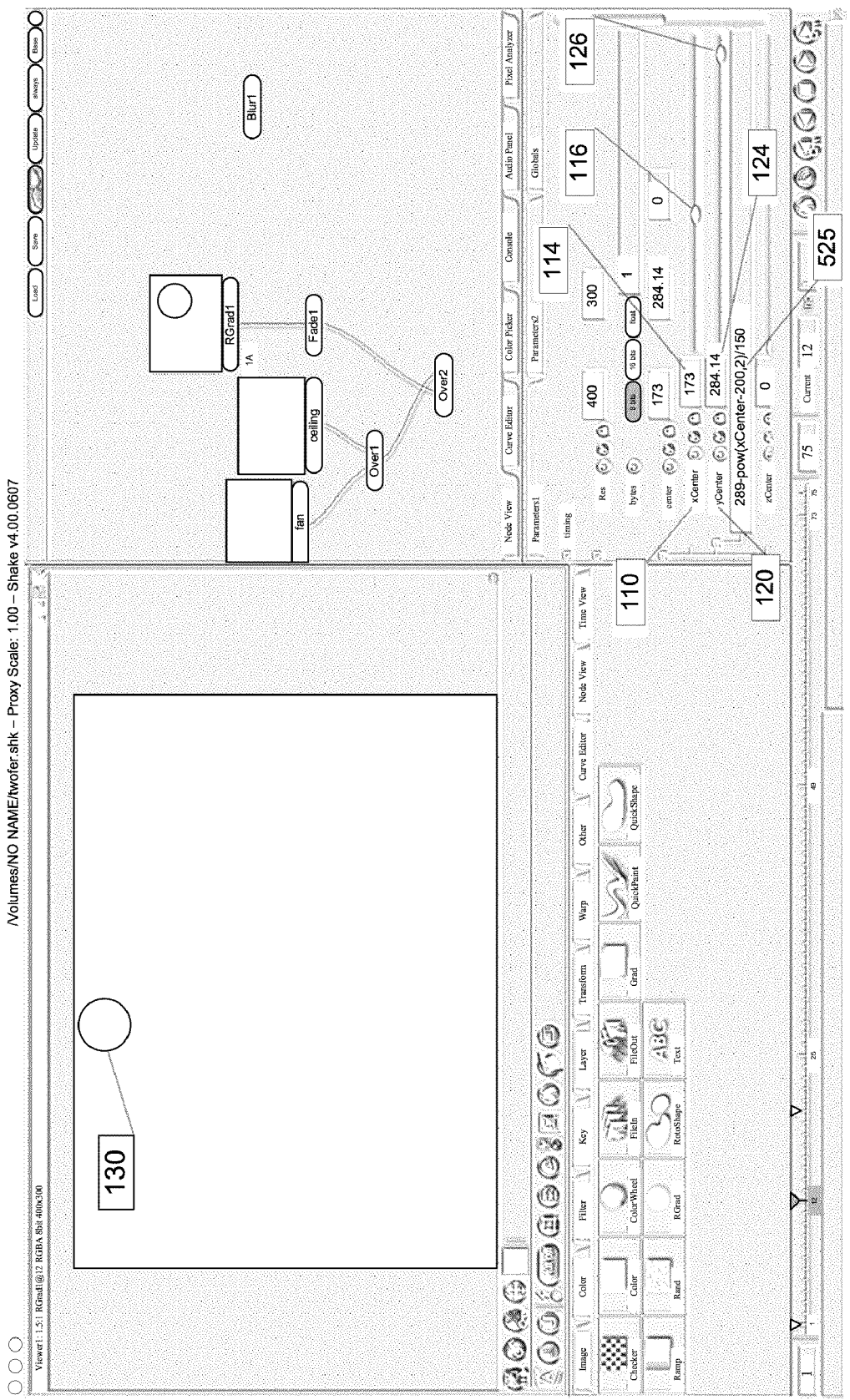
FIG. 6 illustrates a dependent parameter changed as a result of changing an independent parameter.
Figure 7:
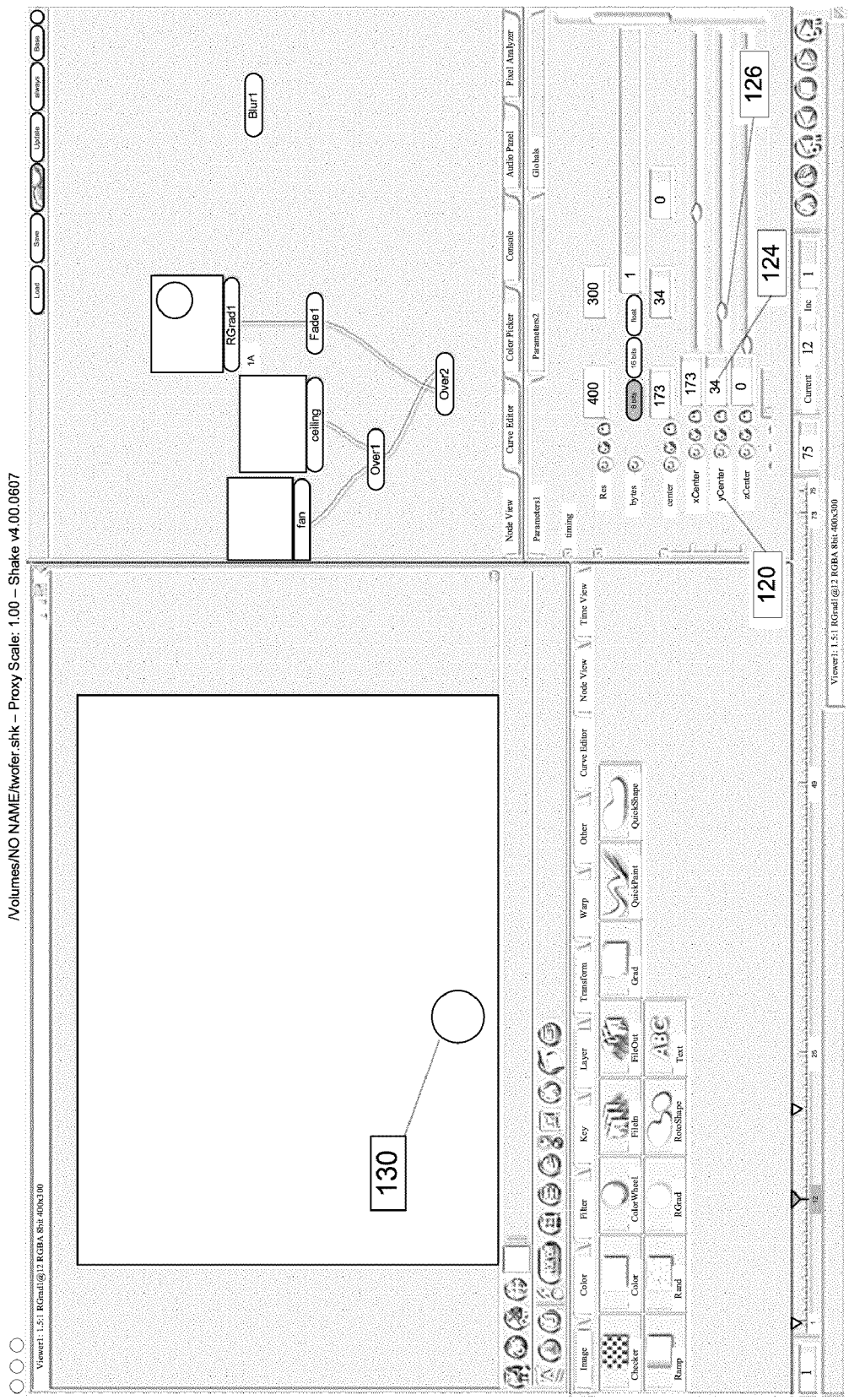
FIG. 7 illustrates the lack of protection for the mathematical formula of an unlocked parameter.

The GUI 100 provides an option for the user to set up a mathematical relationship between two or more parameters. FIGS. 5-7 illustrate the effects of mathematical formulas on unlocked parameters. The formulas in the figures described below were chosen for demonstration purposes. They are not the only possible formulas. Any formula, including but not limited to, a mathematical function, a Boolean expression or a look-up table would be within the scope of the invention.

To set up a mathematical relationship for ycenter 120, the user would enter a formula in display box 124. As seen in FIG. 5, after a formula is entered, a new display box 525 opens to display the formula, and display box 124 resumes showing the value of ycenter 120. Once entered, a formula will determine the value of yCenter 120 until the formula is changed or deleted. In this example, the formula is:

$$289-\text{pow}(x\text{Center}-200,2)/150,$$

where "pow(x,2)" means x-squared. This formula represents a parabola with the point at the top of the parabola. The value of yCenter 120 is now the value calculated by the formula. The formula is a function of xCenter 110, so the value of ycenter 120 depends on the value of xCenter 110.

Because the mathematical relationship has been set up, changing the value of xCenter 110, on which the relationship depends, will change the value of ycenter 120. FIG. 6 illustrates the results of changing the value of xCenter 110 by moving slider 116. The value of yCenter 120 has changed in accord with the formula in display box 525. The xCenter indicators have changed to reflect the new value of xCenter 110. Similarly, the ycenter indicators have changed to reflect the new value of ycenter 120.

The GUI in FIGS. 5-6 changed the value of yCenter 120 in accord with the mathematical formula, but as the following figure will show, the mathematical formula is unprotected.

FIG. 7 illustrates this lack of protection. Specifically, this figure shows the result of using a control of a parameter, yCenter 120, which has a mathematical formula, but is not locked. The figure shows the results of moving slider 126 while yCenter 120 is not locked. Moving slider 126 caused the value of ycenter 120 to change. The change is in accord with slider 126, and without regard for the mathematical formula. Moving slider 126 also caused the mathematical formula in display box 525 (not shown) to be deleted.

As demonstrated above, moving slider 126 deletes the mathematical formula. However, the slider is not the only control that has that effect. In fact, had any control for yCenter 120 been used, the use of that control would have caused the deletion of the mathematical formula.

C. Effects of Locking a Parameter

The departure of a parameter from its mathematical formula is sometimes unwanted. Preventing the unwanted departure of parameters from their mathematical formulas is one aim of some embodiments. This aim is accomplished by use of a lock-in option. In the GUI of this video editing application, the lock-in option is activated for a parameter by selecting a lock-in toggle corresponding to that parameter. The lock-in toggle can also optionally be de-activated. While a lock-in toggle is activated, the corresponding parameter may be described as "locked" or "locked to a mathematical formula". While a lock-in is de-activated, the corresponding parameter may be described as "unlocked".

When a parameter is locked, controls that would otherwise change the value of that parameter are made inoperative. Such inoperative controls may be referred to as "deactivated" or "locked out". In the following figures, various parameters are locked. Various other parameters are unlocked.

Figure 8:
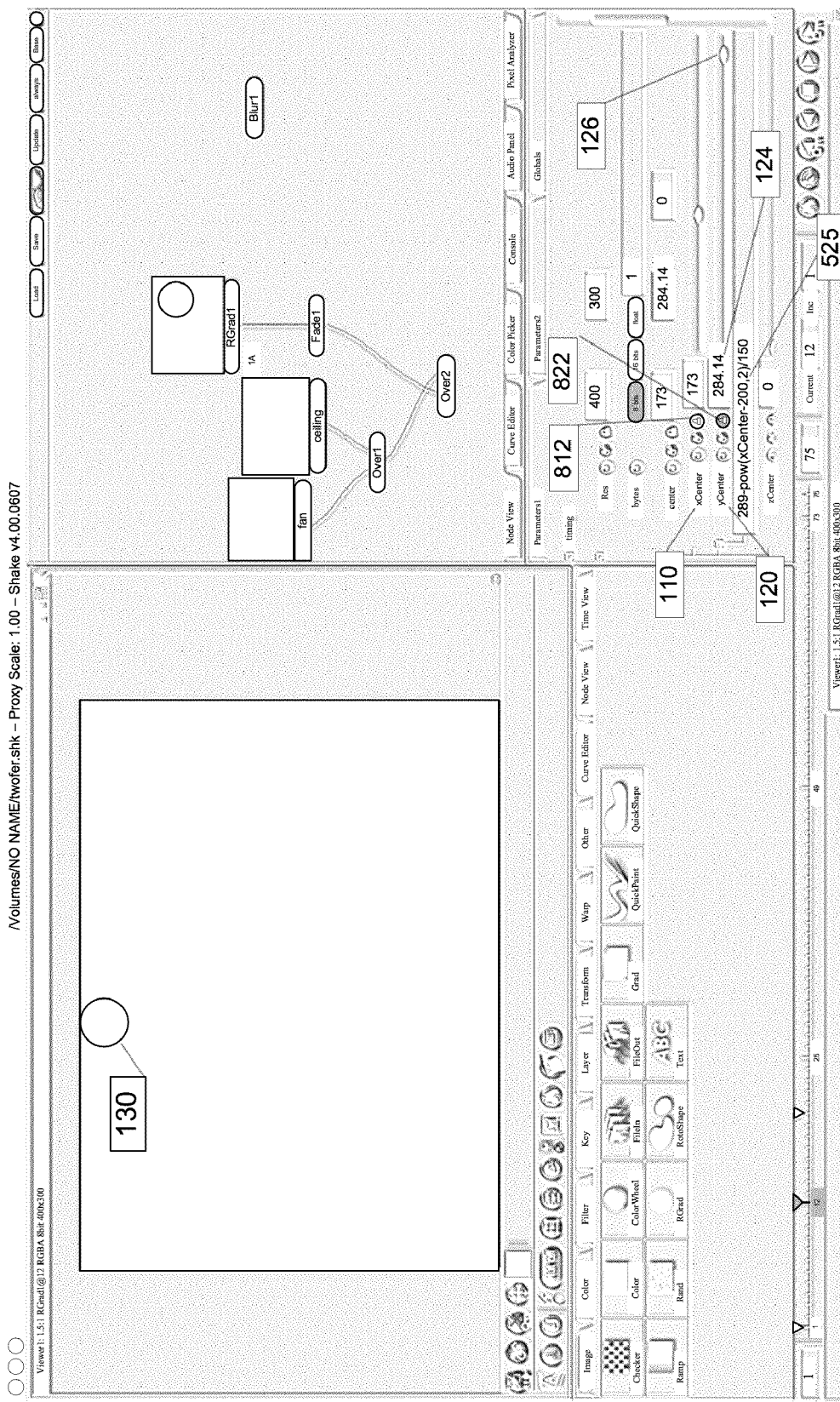
FIG. 8, shows the mathematical formula re-entered and a lock-in option selected.

FIG. 8 illustrates the effects of locking yCenter 120 to a mathematical function of xCenter 110. The mathematical formula that was previously used in FIG. 5:

$$289-\text{pow}(x\text{Center}-200,2)/150,$$

has once again been entered in display box 124. The formula is again shown in display box 525. But this time, lock-toggle 822 has been selected, locking parameter ycenter 120. The locked status of ycenter 120 is illustrated by a change in the appearance of lock-toggle 822. As shown in the figure, lock-toggle 822 is now a picture of a dark lock on a light background rather than a light lock on a dark background. The selection is further illustrated by display box 124, which is highlighted as a result of the locking.

In the GUI, locking ycenter 120 locks out the controls that directly change the value of ycenter 120. Locked out controls include slider 126, display box 124, and display box 525. In addition, dragging object 130 in the vertical direction no longer has any effect. Hence, attempting to use any of those controls results in no change to the value of yCenter 120. Nor does such an attempt delete the mathematical formula. These results stand in contrast to the results shown in the case of an unlocked parameter as previously illustrated in FIG. 7.

Any direct changes to the value of yCenter 120 are prevented by the lock. However, yCenter 120 is locked to the mathematical formula in display box 525, not to some particular value. If the value determined by the formula changes, the value of ycenter 120 changes along with it. The mathematical formula is a function of xCenter 110, so if the value of xCenter 110 changes, the value of the formula changes. The lock-toggle 812 for xCenter 110 is not active, so parameter xCenter 110 is not locked. Consequently the value of xCenter 110 can be changed by using the usual controls for xCenter 110.

Figure 9:
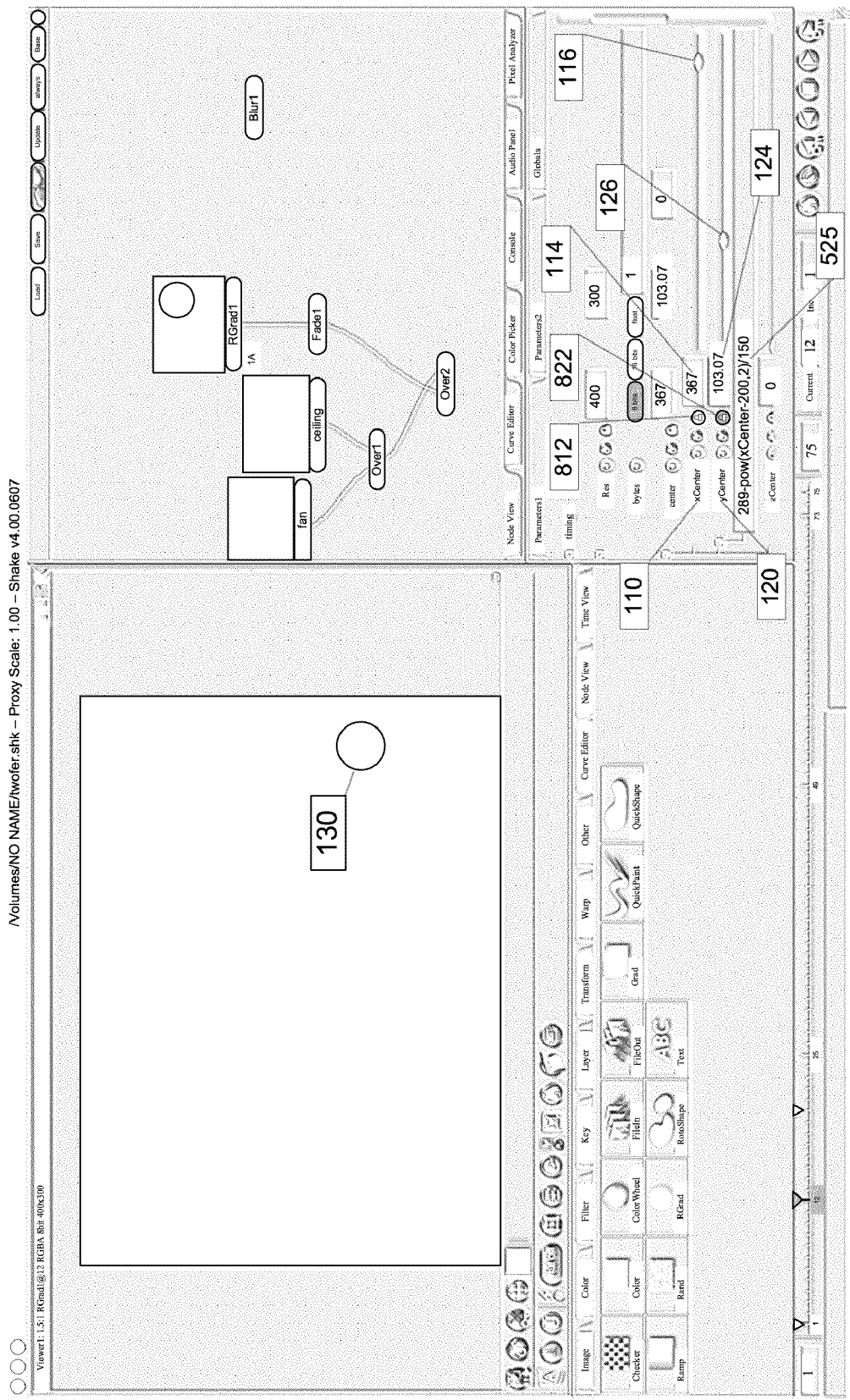
FIG. 9 shows the results of changing an independent parameter when a mathematical formula is locked in for a dependent parameter.

FIG. 9 demonstrates the fact that the value of yCenter 120 can be changed by changing the value of xCenter 110. The figure shows the results of changing the value of xCenter 110, while ycenter 120 is locked to the mathematical function of xCenter 110. The value of xCenter 110 has been directly changed. The value of ycenter 120 has changed in accord with the formula in display box 525. The ycenter indicators have changed to reflect the new value of ycenter 120.

Figure 10:
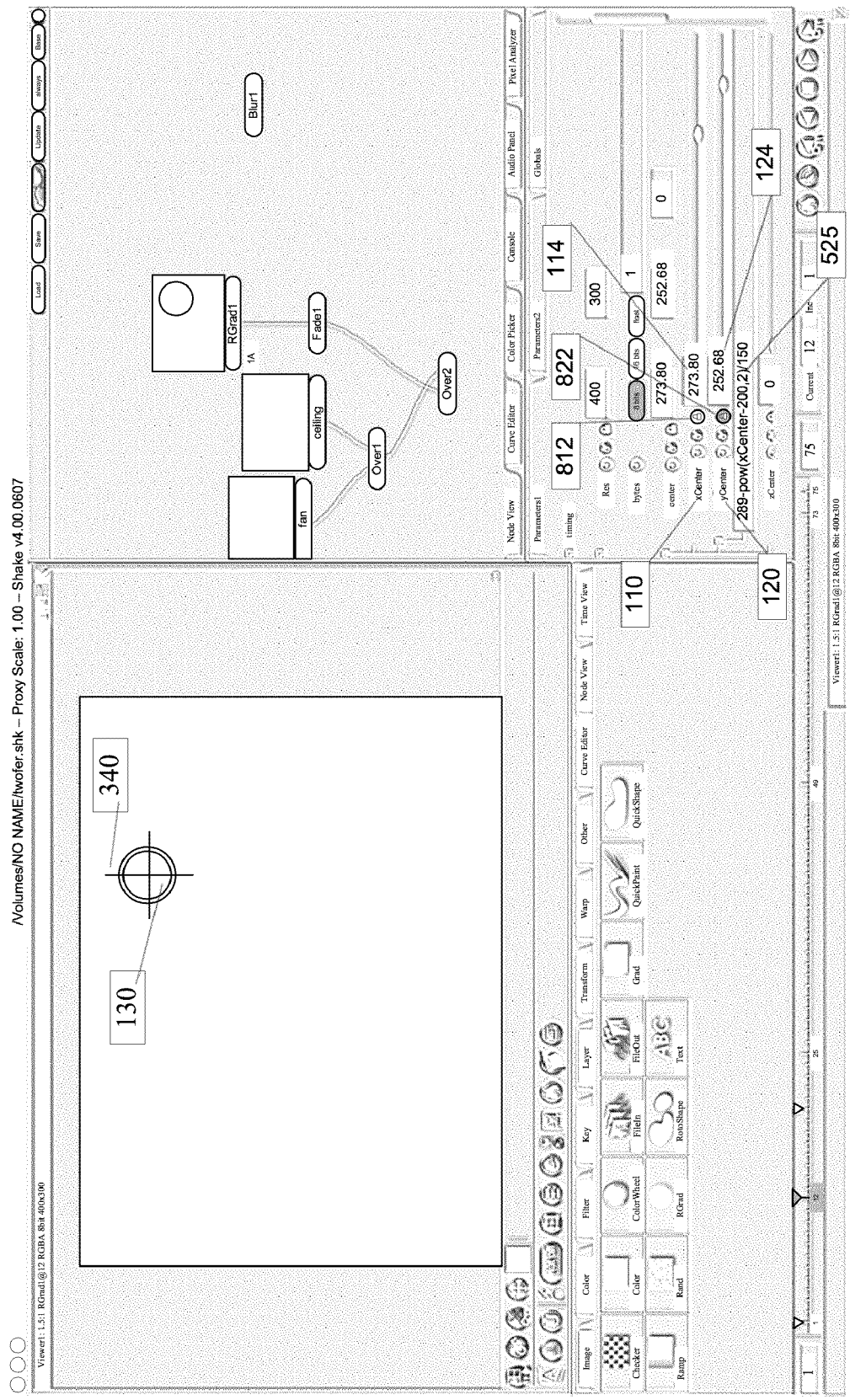
FIG. 10 illustrates that an individual control can be disabled with respect to a locked parameter, but not disabled with respect to an unlocked parameter.

The previously described controls are each capable of affecting the value of only one parameter. However, in this GUI, some controls can affect more than one parameter. Locking a parameter can lock out the effects that control would have on the locked parameter, while leaving the effects of the control on unlocked parameters unchanged. In FIG. 10, ycenter 120 is locked, but xCenter 110 is not. Dragging tool 340 ordinarily affects both xCenter 110 and ycenter 120. The figure shows the effects of dragging object 130 in the horizontal direction using the dragging tool 340. Object 130 has moved in the horizontal direction, indicating a change in the value of xCenter 110.

As well as moving horizontally, Object 130 has moved vertically. This motion demonstrates a change in the value of ycenter 120. This does not contradict the described effects of the lock. Rather, the change in the value of ycenter 120 is a result of the change in the value of xCenter 110. The only direct effect of the dragging tool 340 was to change the value of xCenter 110. The change in the value of ycenter 120 was an automatic change by the GUI 100. The change kept the value of ycenter 120 consistent with the mathematical formula shown in display box 525.

D. Relationships with More than Two Parameters

Previous figures illustrated mathematical functions relating a single dependent parameter to a single independent parameter. Some embodiments allow relationships involving more than two parameters.

Figure 11:
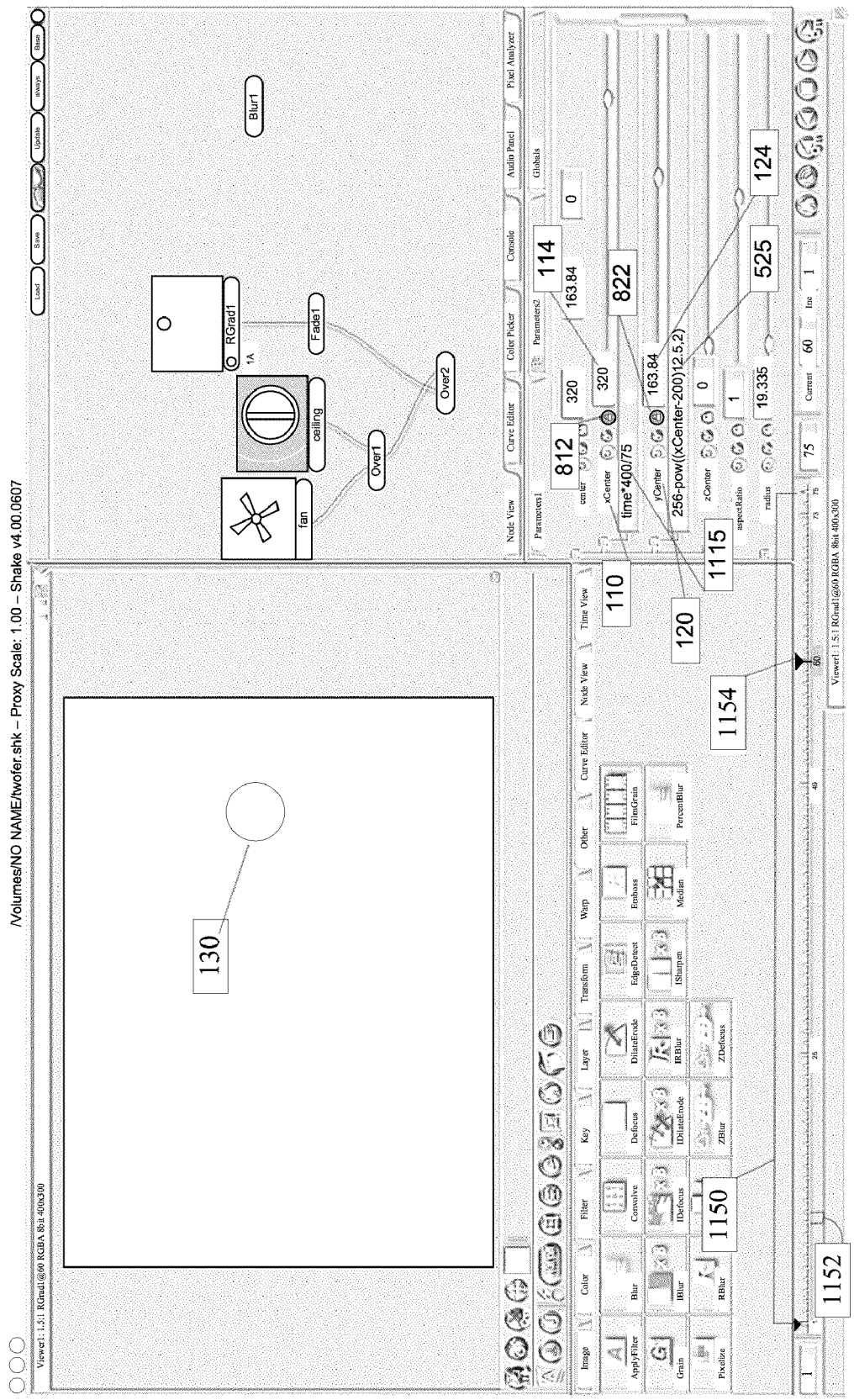
FIG. 11 shows a chain of dependencies of parameters.
Figure 12:
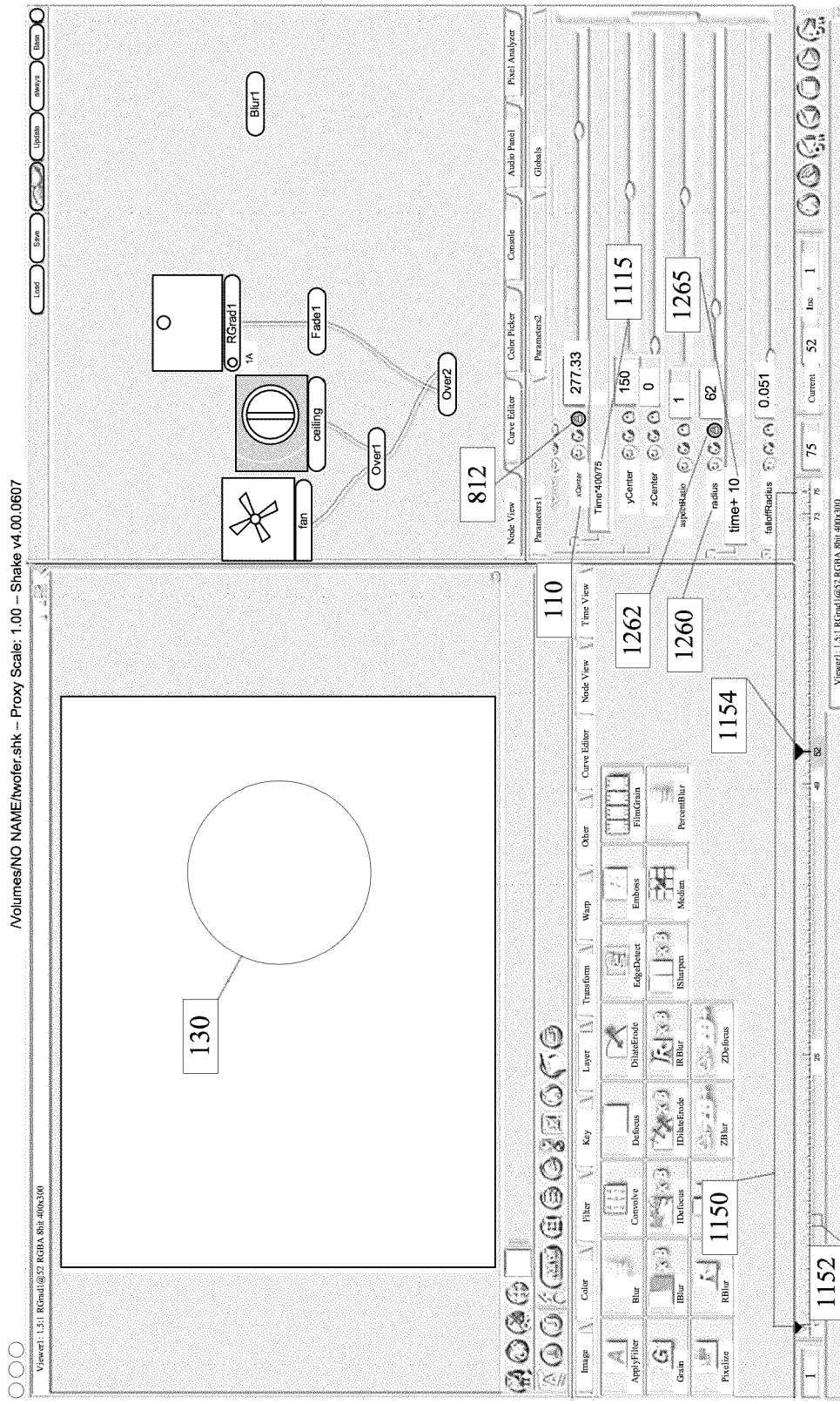
FIG. 12 shows two parameters locked to functions of one independent parameter.

So far, only two parameters have been introduced. So, in order to illustrate relationships with more than two parameters, some previously unmentioned parameters must be introduced. One parameter is time. In FIG. 11, time is shown on time scale 1150. Note that in these embodiments each increment of time 1152 on time scale 1150 represents one frame of video. The value of time for this figure is represented by the position of indicator 1154. Another parameter, first shown in FIG. 12, is radius 1260. Radius 1260 determines the radius of object 130. The larger the value of radius 1260, the larger the radius of object 130.

1. Chain of Dependencies

The GUI allows a chain of dependencies. In a chain of dependencies, one parameter depends on another, which depends on a third, and so on for whatever number of parameters the user needs. FIG. 11 illustrates a chain of dependencies with three parameters. In the figure are: (1) one independent parameter, time, (2) a first dependent parameter, xCenter 110, which depends on time, and (3) a second dependent parameter, yCenter 120, which in turn depends on xCenter 110.

The last two parameters in the chain are locked. Parameter xCenter 110 is locked to the formula, "time*400/75", shown in display box 1115. This formula is a function of time. Parameter yCenter 120 is locked to the formula, "256-pow((xCenter-200)/12.5,2)", shown in display box 525. This formula is a function of xCenter 110.

In this embodiment, all controls that would otherwise affect the value of xCenter 110 are locked out. Likewise, all controls that would otherwise affect the values of yCenter 120 are locked out. Because of the locks, the only way to affect the values of either xCenter 110 or ycenter 120 is by changing the values of their respective formulas. The only way to do that is to change the value of the parameter at the beginning of the chain, time.

The net result of this chain of dependencies is that as the time index increases, object 130 follows a parabolic path across the screen. This result holds for this embodiment and with these example formulas. This is not a general feature of such chains of dependency.

2. Multiple Dependent Parameters, One Independent Parameter

Another relationship with more than two parameters is one in which multiple parameters depend on a single parameter. FIG. 12 illustrates such a relationship. In FIG. 12 two parameters depend on a single other parameter. Specifically, xCenter 110 and radius 1260 each depend on time.

Each of the two dependent parameters is locked to its own formula. In this figure, the value of xCenter 110 is determined by the function of time, "time*400/75", shown in display box 1115. Parameter xCenter 110 is locked to this mathematical formula. The value of radius 1260 is determined by the function of time, "time+10", shown in display box 1265. As shown in this figure, lock-toggle 1262 of radius 1260 has been selected, locking radius 1260 to its mathematical formula.

Because of the given formulas, object 130 would move to the right and grow larger as time increases.

3. Multiple Independent Parameters, One Dependent Parameter

Figure 13:
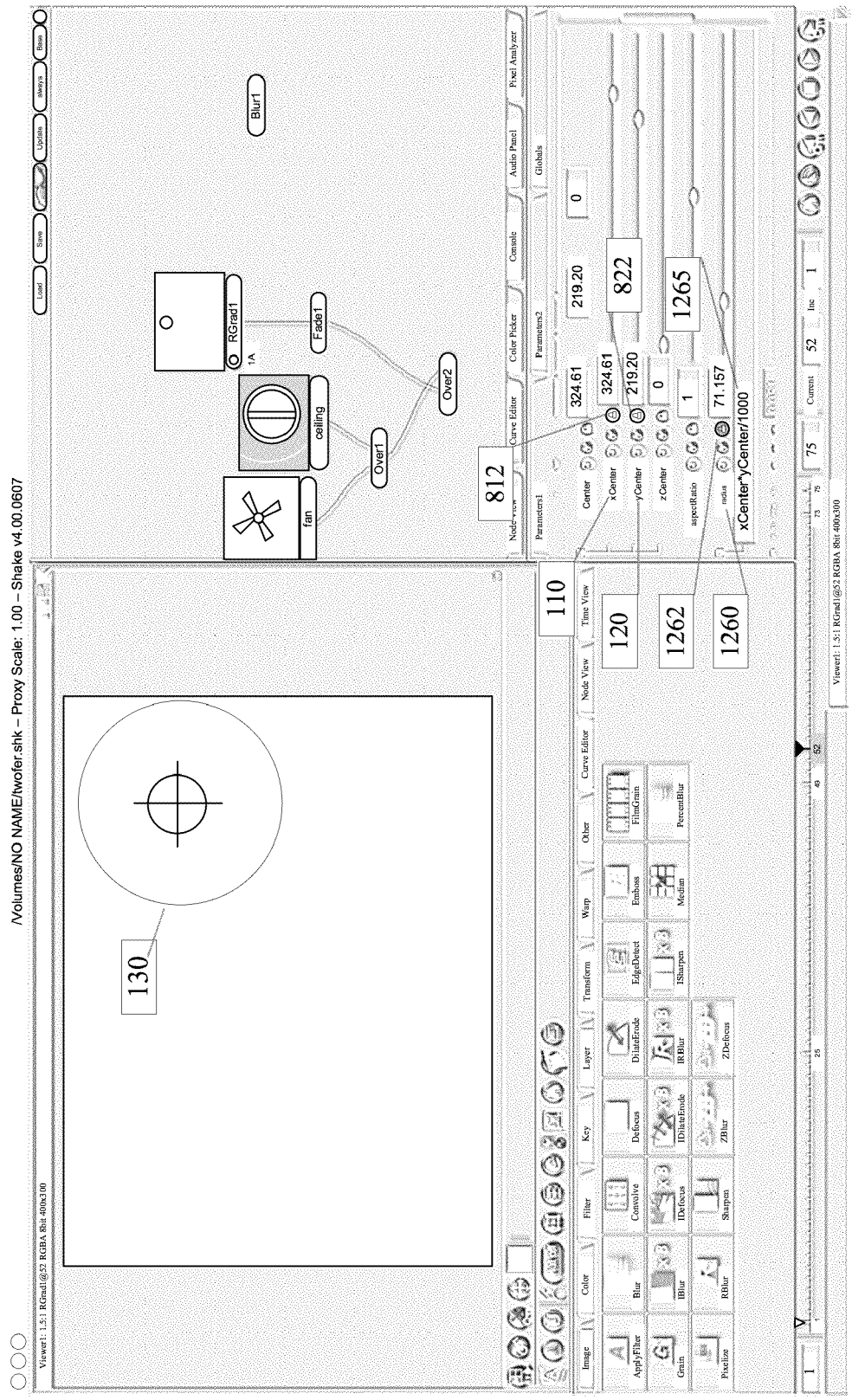
FIG. 13 shows a parameter depending on two different independent parameters.

Another relationship of more than two parameters is one in which one parameter depends on multiple other parameters. FIG. 13 illustrates this type of relationship. In the figure, one parameter is dependent on the value of two other parameters.

In FIG. 13, radius 1260 is locked to a function dependent on xCenter 110 and yCenter 120. The function, "xCenter*yCenter/1000", of xCenter 110 and ycenter 120 that determines the value of radius 1260 is shown in display box 1265. In this figure, xCenter 110 and ycenter 120 are unlocked, radius 1260 is locked.

With the given formula, the radius of object 130 increases when the value of xCenter 110 increases. Similarly, the radius of object 130 also increases when the value of yCenter 120 increases.

4. Multiple Independent Parameters, Multiple Dependent Parameters

Figure 14:
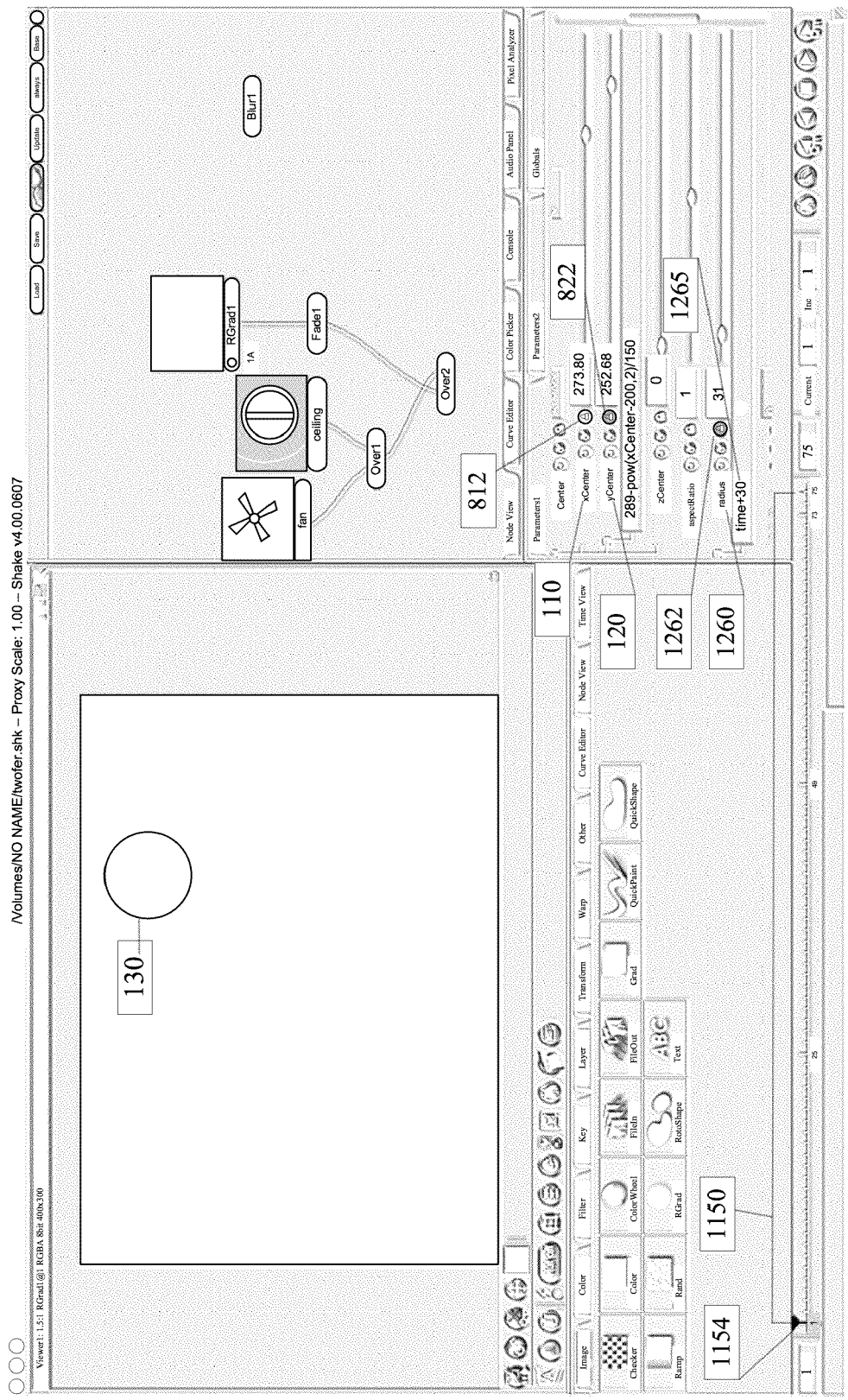
FIG. 14 shows two separate sets of mathematical relationships among parameters.

Still another relationship of more than two parameters is one in which there are multiple sets of relationships between parameters. FIG. 14 illustrates this type of relationship. In the figure, one parameter is dependent on the value of a second parameter and a third parameter is dependent on the value of a fourth parameter.

In FIG. 14, radius 1260 is locked to a function dependent on time. Also, yCenter 120 is locked to a function dependent on xCenter 110. The parameters in the first relationship are radius 1260 and time. The parameters in the second relationship are xCenter 110 and ycenter 120. No parameter from the first relationship is found in the second relationship. No parameter from the second relationship is found in the first relationship. This demonstrates the ability of some embodiments to set several mutually independent relationships among parameters. Then, once the relationships are set, to lock-in the relationships.

E. Relationships Among Parameters from Different Objects

Previous examples of the use of the GUI 100 only used a single object and its parameters. Some embodiments, including the GUI 100, are not limited to a single object. In the GUI 100 multiple objects can be used in the same video editing session. The GUI 100 allows the values of parameters that define one object to depend on the values of parameters that define another object. In other words, a parameter can be locked to a mathematical relationship that depends on a parameter from a separate object.

FIGS. 15-18, demonstrate this option of GUI 100.

Figure 15:
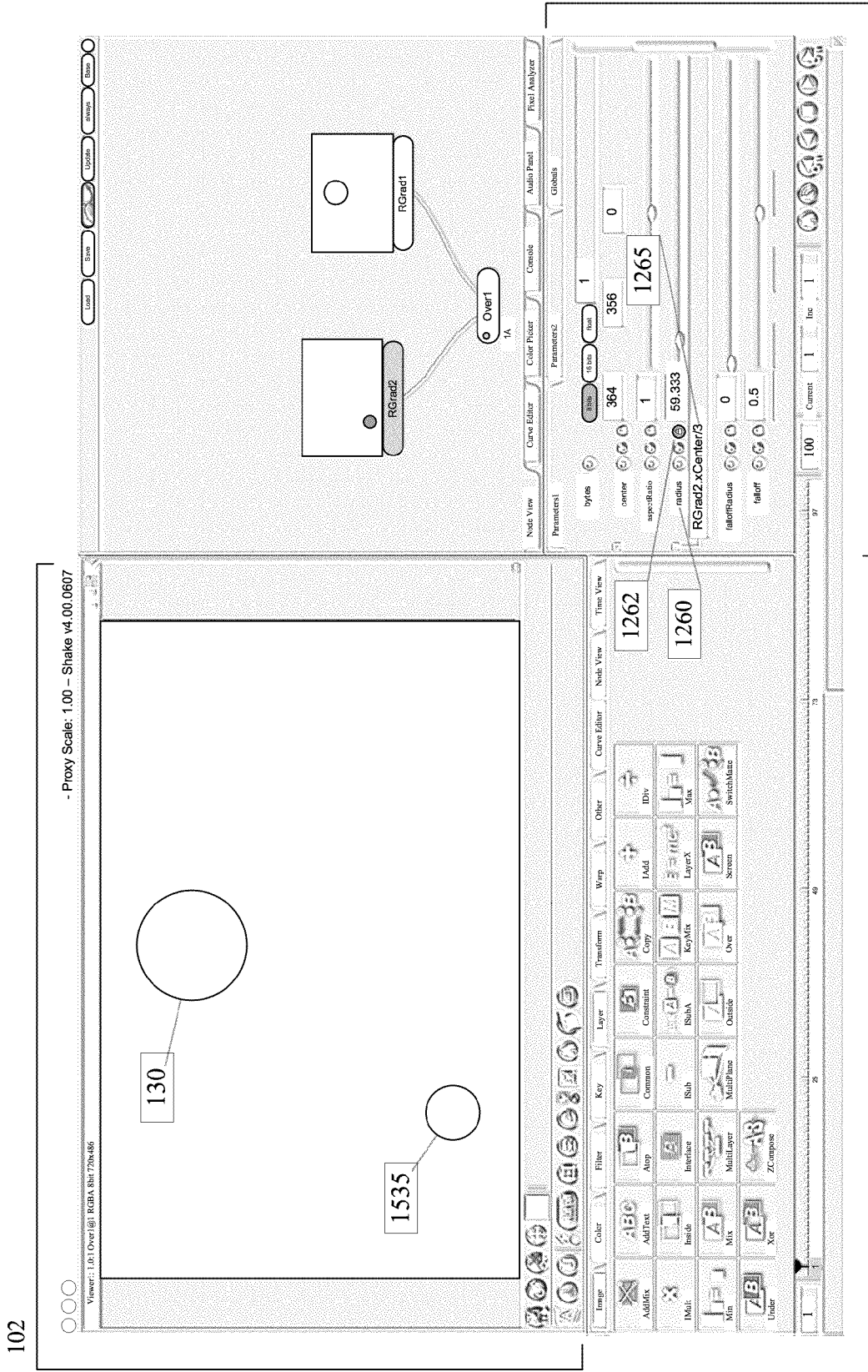
FIG. 15 illustrates a parameter of a first object, locked to a mathematical formula that depends on a parameter from a separate object.

FIG. 15 illustrates two objects and a parameter of the first object that depends on a parameter of the second object. In the figure, there are two objects in display area 102, object 1535 and object 130. The parameters of object 1535 are not shown in this figure. The parameters displayed in parameter control area 101 apply to object 130. In parameter control area 1535, radius 1260 is locked to the formula in display box 1265.

This formula is a different from those in the previous figures. In the previous figures, the independent parameters referred to in the formulas were all parameters of the same object 130. Here, the independent parameter is a parameter of object 1535. The formula is:

RGrad2.xCenter/3

Part of the formula is in front of a period. In the GUI 100, that part of the formula indicates that the independent parameter is a parameter of a different object. In this case, object 1535. The GUI 100 calls that object "RGrad2". Because of the reference to RGrad2, the "xCenter" after the period refers to the xCenter parameter of RGrad2 (object 1535), not to the xCenter 110 (not shown) of object 130.

Figure 16:
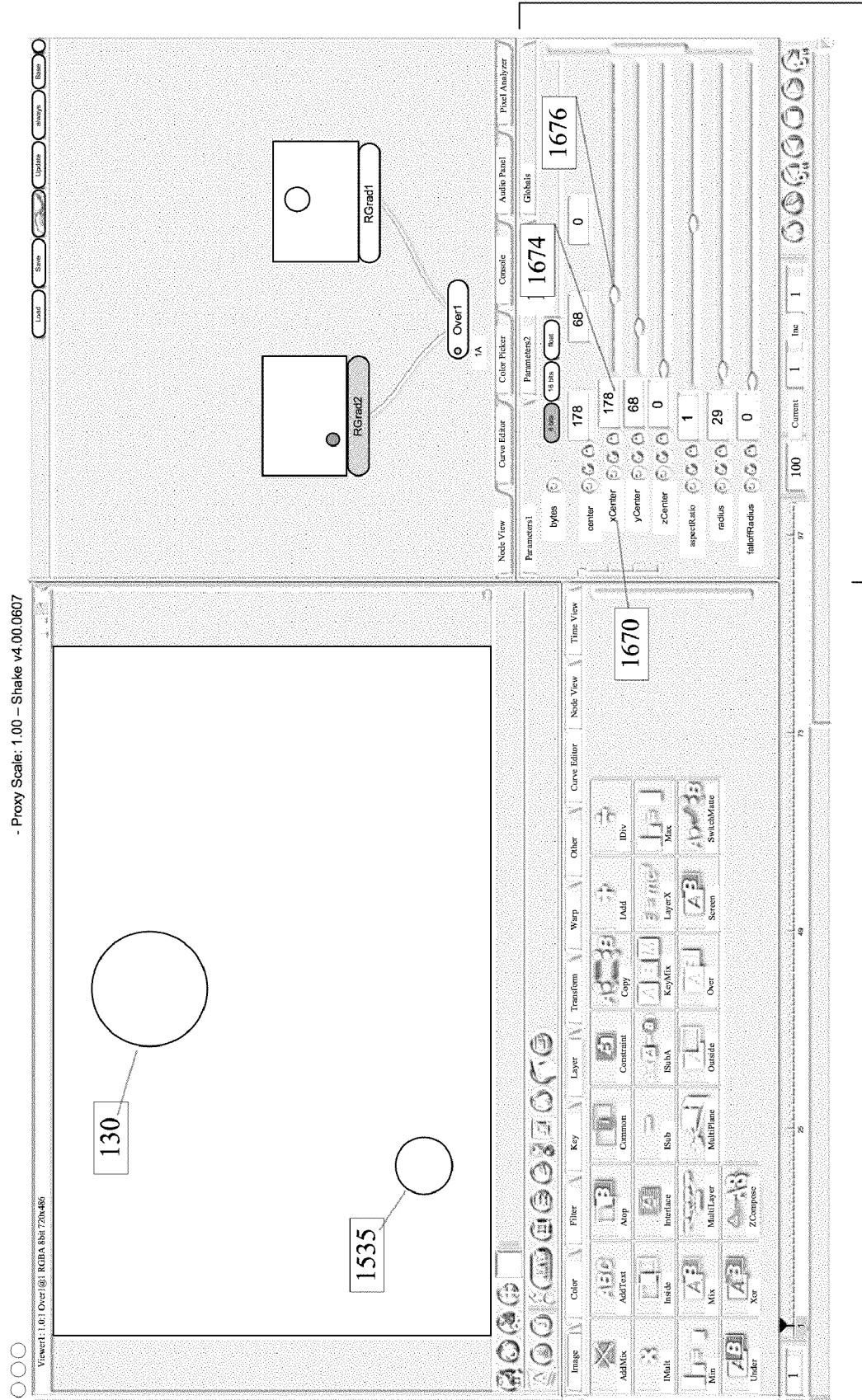
FIG. 16 illustrates the parameters of the separate object.

The parameters of object 1535 are shown in FIG. 16. In FIG. 16, parameter control area 101 has been switched from displaying the parameters of object 130 to displaying the parameters of object 1535. In this figure, parameter control area 101 shows that object 1535 has its own position co-ordinates, one of which is xCenter 1670. The value of xCenter 1670 is displayed in display box 1674. The value of xCenter 1670 can be changed by moving slider 1676.

As shown in the description of FIG. 15, the value of radius 1260 depends on the value of xCenter 1670. Because of this dependency, changing the value of xCenter 1670 would change the radius of object 130.

Figure 17:
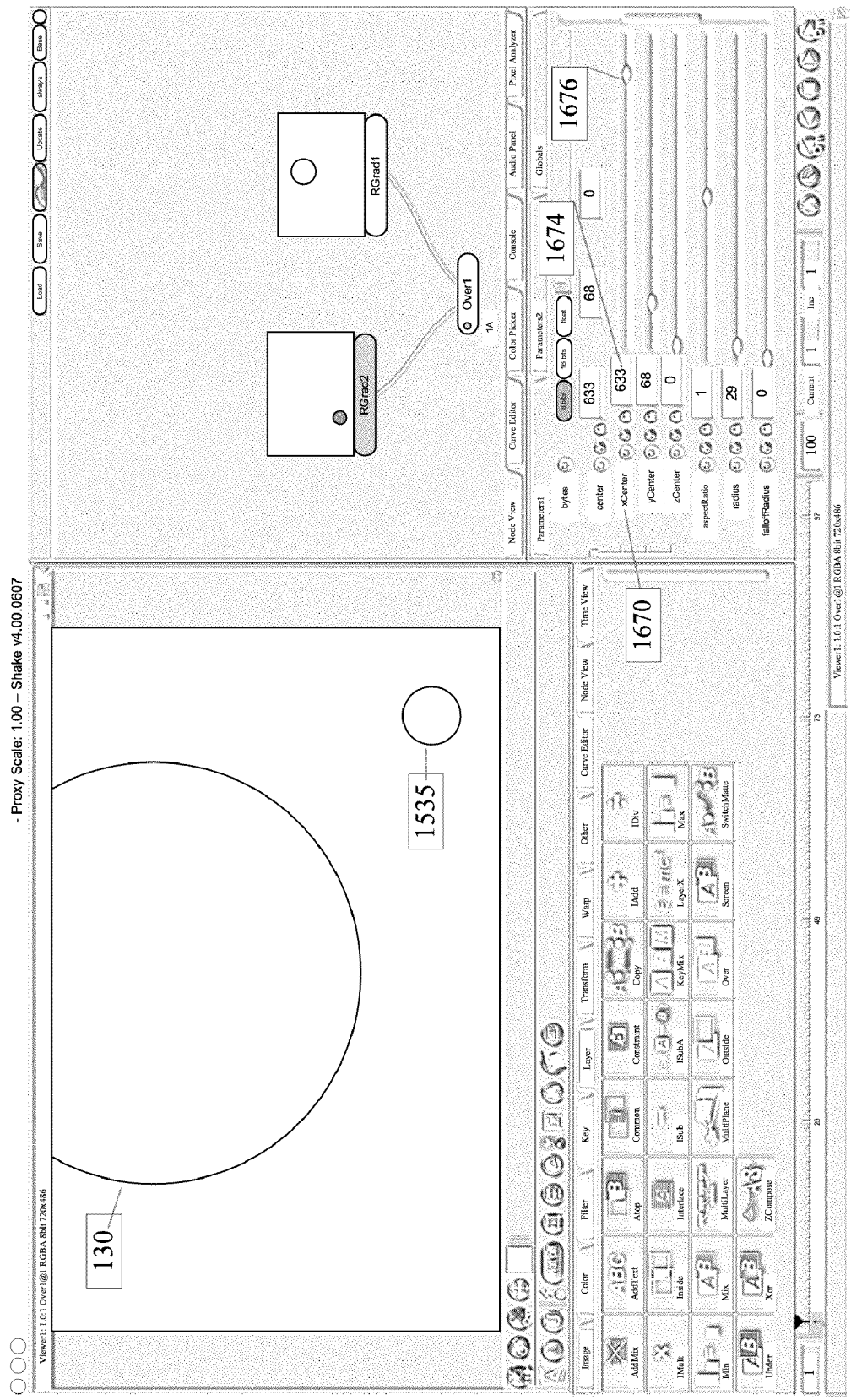
FIG. 17 demonstrates that a change in the value of a parameter of the separate object, can cause a change in the value of a parameter of the first object.

FIG. 17 demonstrates that a change in the value of xCenter 1670 changes the radius of object 130. Because xCenter 1670 is the horizontal position parameter of object 1535, changing the value of xCenter 1670 has changed the horizontal position of object 1535. Because of the mathematical formula in display box 1265 (not shown), changing the value of xCenter 1670 has also changed the radius of object 130. Note that the value of xCenter 1670, shown in display box 1674 is now "633".

Figure 18:
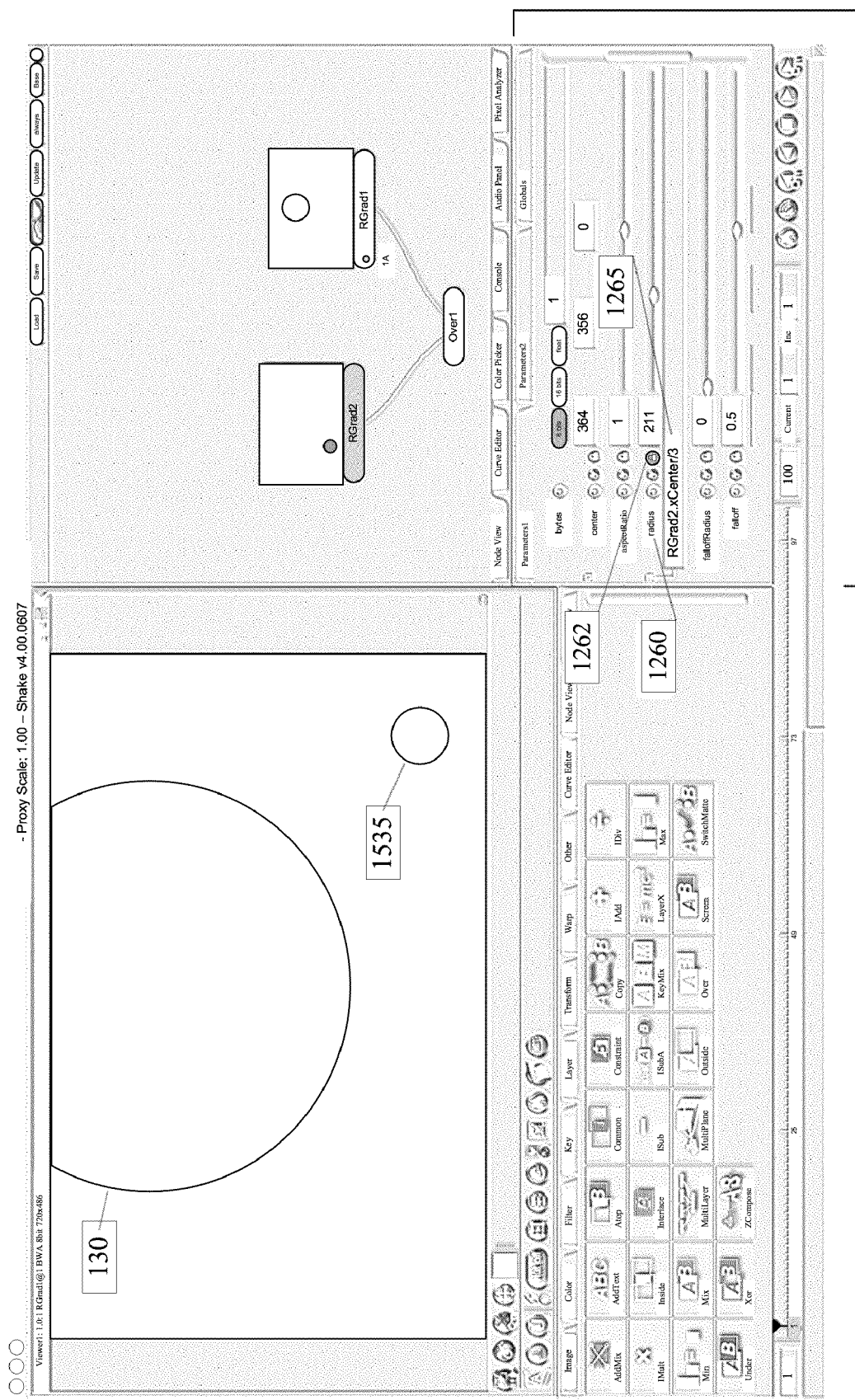
FIG. 18, shows the parameters of the first object after the change.

The agreement of the value of radius 1260 with its mathematical formula is shown in FIG. 18. In this figure, parameter control area 101 has been switched back to showing the parameters of object 130. The formula in display box 1265, "RGrad2.xCenter/3", takes the value of xCenter 1670 (as noted previously, "633") and divides it by 3 to determine the value of radius 1260. In this example the formula determines "633/3=211". The value of radius 1260, shown in display box 1264, is now "211".

Figure 19:
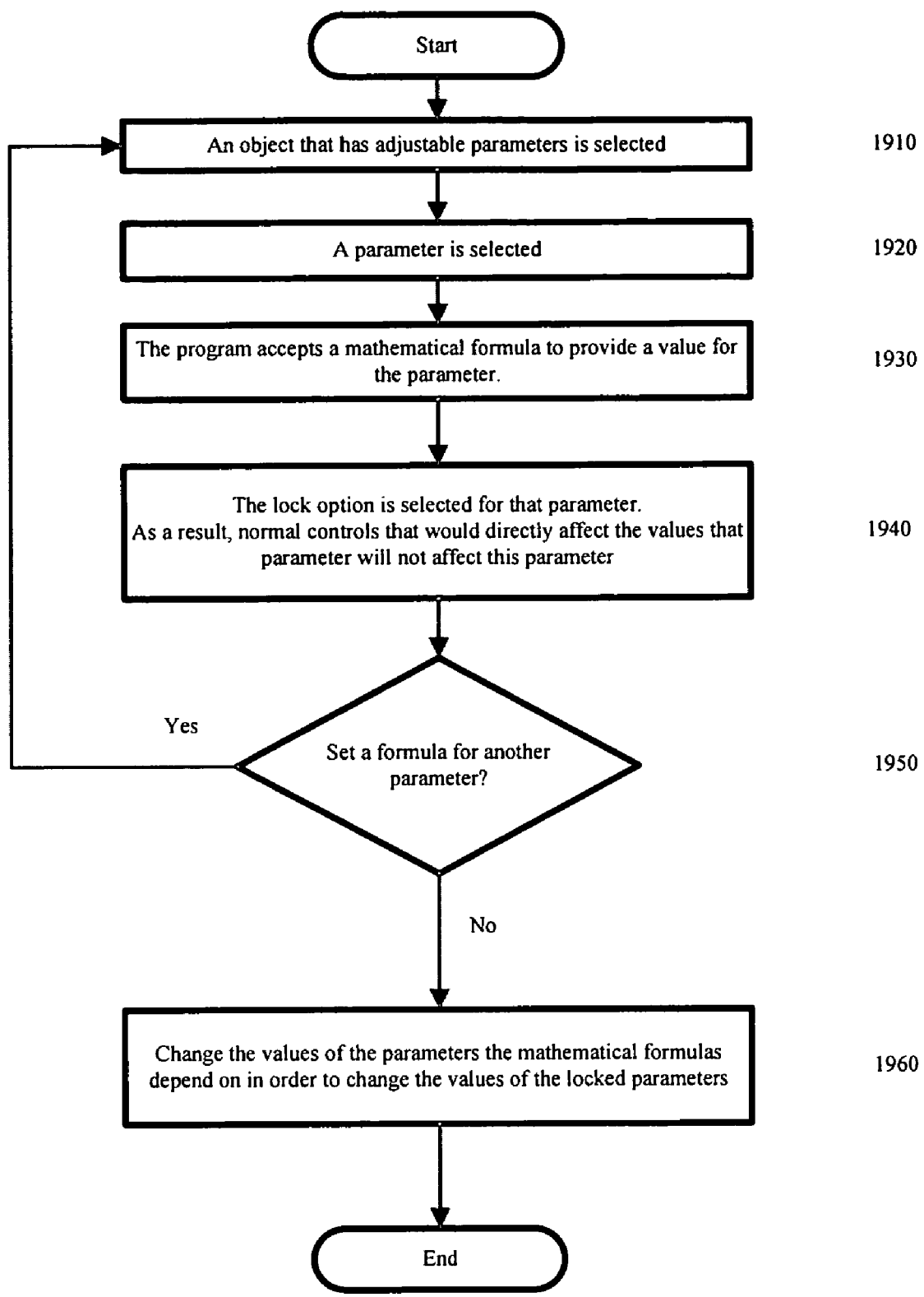
FIG. 19 is a flowchart of the steps a user might take when using a GUI representing one embodiment.

FIG. 19 is a flowchart of the steps a user might take when using a method that represents one embodiment.

In box 1910, an object is selected. The object has adjustable parameters. In box 1920 a parameter is chosen. This parameter will be a dependent parameter.

In box 1930 the program accepts a mathematical formula. The mathematical formula will set the value of the dependent parameter. The mathematical formula is based on the value of at least one other parameter. The formula will set values for the dependent parameter based on the formula and the values of those other parameters.

In box 1940, the lock option for the parameter is selected. Note that in many embodiments the user has the option of locking the parameter at any time. It doesn't have to be locked immediately after the formula is entered. Once the parameter is locked, at least some of the controls are deactivated.

In diamond 1950, the user decides whether to set another formula for another parameter. Note that in many embodiments, the user has the option of going back at any time to set up new mathematical relationships, and to change the old ones.

In box 1960 the parameters on which the mathematical formulas depend are changed. This changes the values of the locked parameters. This does not change the formulas of the locked parameters.

F. Types of Parameters

Some embodiments, including the GUI 100 make no distinction among types of parameters for the purpose of setting up mathematical relationships. The previously described figures show relationships among several types of parameters.

FIGS. 5-6 and 8-10 show mathematical relationships between parameters of similar type to each other, specifically xCenter 110 and ycenter 120. Both parameters are location coordinates. The parameters measure distance along two different axes. Those embodiments allow a relationship between those two parameters. That demonstrates that the embodiments could relate parameters that are of similar type to each other.

FIGS. 11-12 show mathematical relationships between parameters of different types from each other, specifically xCenter 110, radius 1260, and time. Parameter xCenter 110 is a location coordinate. Parameter time is a video frame index. Parameter radius 1260 is determines the size of an object. These parameters measure three different types of units. Those embodiments allow relationships among these three parameters.

III. Description of Features of Some Possible Alternate Embodiments

A. Formulas Active for Some Values of Independent Parameters, but not all Values of Independent Parameters Some embodiments may have limitations on the allowable values of the parameters. In the use of some of those embodiments, the user may choose a dependent parameter. The user may set a mathematical formula for the dependent parameter. The user may lock the dependent parameter to the mathematical formula. Then the dependent parameter will remain consistent with the mathematical formula, but with some exceptions.

Such an exception might be that the value of the dependent parameter is fixed at some limit. The limit could be a design limitation. For example, the program might not allow the value of a co-ordinate to exceed the maximum or minimum values of the on screen display.

The limit could also be an inherent limit of the program. An example of such limit would be where the mathematical formula returns a number larger than the program can handle.

In some embodiments, if the value generated by the mathematical formula exceeds one of these limits the parameter will not be equal to the value of the formula. Instead, the value of the parameter will be set by the program as the value of the limit. In some other embodiments, the program will set the parameter at a null value when the value generated by the mathematical formula exceeds the limit.

Other embodiments may round or truncate the result of a formula to some number of decimal places or significant figures.

These embodiments are still consistent with the invention, so long as the lock-in sets the value of the locked parameter to, or close to, the result of the formula for at least some given values of the parameter or parameters on which it depends.

B. Lock-Ins of Formulas

The toggles in the previously described embodiments are options related to the individual parameters. Other embodiments are also possible. In some other embodiments, there may be a separate area in which to enter mathematical formulas. With the lock-in option being related to the formulas rather than parameters. Whether the lock-in is characterized as locking the parameter or locking the formula, those embodiments are still embodiments of the invention. Locking the formula is equivalent to locking the parameter.

C. Multiple Windows

The GUI embodiments illustrated above all demonstrate the invention using one window with multiple sub-areas. This is not a requirement of the invention. Some other embodiments may involve multiple windows. Some of those embodiments may have parameters in one window being referred to in another window. Some other embodiments of the invention may involve a full screen. Some other embodiments of the invention may involve a text box. Still further embodiments may use parameters that are not displayed at all. One example of such an embodiment would be where an independent parameter and its values are contained in an object or file that the user refers to, but does not open. Still other embodiments may involve more or fewer sub-areas.

D. Computer Generated Formulas

The examples provided above involved user determined mathematical relationships, however some embodiments allow the computer program to work out a relationship based on indirect determination of the user's intention. For instance, a user could enter a few points on a hypothetical path and the computer could work out the mathematical relationship necessary to take an object smoothly along that path.

E. Inequalities

All of the above examples allow the user to set the value of a parameter equal to a particular mathematical relationship. Other possible embodiments could allow the user to constrain parameters to be greater than a particular mathematical function, less than a particular function, between two or more functions, or outside of a region between two or more functions. Such embodiments would allow the locked parameter to be changed by its controls, but only within the specified limits.

F. Disabling Controls

The GUI 100 described above manifests deactivated controls by ignoring attempts to use the controls. However, deactivated controls, which can interchangeably described as "inactive", "deactivated", "cannot be activated", or "locked out" controls, may manifest in other ways in other GUIs. Another way of making the controls inoperative would be to remove them from the GUI while the parameter is locked. Still another way of making the parameters inoperative would be to allow the controls to change the value temporarily while the control is being actively manipulated, but revert to the locked in mathematical relationship once the control is no longer being actively manipulated Yet another way of making the controls inoperative would be to allow the control itself to be freely, but not have that move affect the value of its corresponding parameter. All of these ways, along with any other way of deactivating the controls, are within the scope of the invention.

While embodiment of the invention have been described with reference to numerous specific detail, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claim.

What is claimed is:

1. A method of implementing a graphical user interface (GUI) for a program executing on a computing device, said method comprising:

providing a first GUI control for adjusting a first value of a first user adjustable parameter;

providing a second GUI control for adjusting a second value of a second user adjustable parameter, said second GUI control adjusting the second value independently of the first value; and providing a lock-in control that, when activated, prevents the second GUI control from adjusting the second value but locks the first and second values together so that adjustments to the first GUI control adjust the first value and in turn the second value.

2. The method of claim 1, wherein the lock-in control is a first lock-in control, the method further comprising:

providing a third GUI control for adjusting a third value of a third user adjustable parameter, said third GUI control adjusting the third value independently of the second value; and providing a second lock-in control that when activated, prevents the third GUI control from adjusting the third value but locks the second and third values together so that adjustments to the second GUI control adjust the second value and in turn the third value.

3. The method of claim 1, wherein the GUI is an interface for a video editing application.

4. The method of claim 1, wherein said first GUI control and said second GUI control are slider controls.

5. The method of claim 1, wherein said second GUI control comprises a textbox control for entering the second value of the second user adjustable parameter.

6. The method of claim 1 further comprising providing a display area for displaying a draggable object that adjusts the first and second values of the first and second user adjustable parameters by dragging the draggable object in the display area, wherein while the lock-in control is active, the draggable object cannot adjust the second value of the second user adjustable parameter except to an extent that dragging the object adjusts the first value of the first user adjustable parameter and in turn adjusts the second value of the second user adjustable parameter.

7. The method of claim 1 further comprising providing a display area for displaying an object, wherein a part of the object is for dragging to adjust the first and second values of the first and second user adjustable parameters, wherein while the lock-in control is active, the draggable part of the object cannot adjust the second value of the second user adjustable parameter except to an extent that dragging the part of the object adjusts the first value of the first user adjustable parameter and in turn adjusts the second value of the second user adjustable parameter.

8. The method of claim 1 further comprising providing a display area for displaying an object, wherein while the lock-in control remains active, clicking on the object in the display area cannot adjust the second value of the second user adjustable parameter except to an extent that clicking on the object adjusts the first value of the first user adjustable parameter and in turn adjusts the second value of the second user adjustable parameter.

9. The method of claim 1, wherein a plurality of values of a plurality of user adjustable parameters depend on the first value of the first user adjustable parameter.

10. The method of claim 1, wherein the locking of the first and second values together is based on a mathematical relationship relating the second value of the second user adjustable parameter to the first value of the first user adjustable parameter.

11. The method of claim 1 further comprising providing a plurality of mathematical relationships for a set of user adjustable parameters, said plurality of mathematical relationships creating a network of independent and dependent parameters.

12. The method of claim 1 further comprising providing a display area for displaying an object according to the first and second values.

13. The method of claim 12, wherein activation of the lock-in control prevents a user from manipulating the object to directly adjust the second value.

14. The method of claim 13, wherein the activation of the lock-in control does not prevent the user from manipulating the object to directly adjust the first value and in turn indirectly adjust the second value.

15. A method of defining a computer program having a graphical user interface (GUI), said method comprising:
 defining a first user-adjustable GUI control for adjusting a first value of a first parameter;
 defining a second user-adjustable GUI control for adjusting a second value of a second parameter independently of adjustments to the first value;
 defining a third GUI control for setting up a mathematical inequality relationship relating the first value to the second value; and
 defining a lock control for locking the second value to the mathematical inequality relationship (i) to prevent adjustments to the second user-adjustable GUI control from adjusting the second value that violate the defined mathematical inequality relationship between the first and second values, but (ii) to allow an adjustment to the second user-adjustable GUI control to adjust the second value so long as the second value after the adjustment does not violate the defined mathematical inequality relationship between the first and second values.

16. The method of claim 15, wherein the GUI is an interface for a video editing application.

17. The method of claim 15, wherein the locking of the second value to the mathematical inequality relationship operates when the lock control is activated.

18. The method of claim 15, wherein the mathematical inequality relationship is selected from a group composed of:
 a) greater than;
 b) less than;
 c) greater than or equal to;
 d) less than or equal to; and
 e) not equal to.

19. The method of claim 15, wherein the first user-adjustable GUI control and the second user-adjustable GUI control are slider controls.

20. The method of claim 15, wherein the lock control that when activated, further adjusts the second value so that the mathematical inequality relationship between the first and second values is maintained when the first user-adjustable GUI control adjusts the first value.

21. The method of claim 15, wherein said mathematical inequality relationship further comprises multiple mathematical relationships.

22. The method of claim 15, wherein the first value and the second value are constrained to be in a region between a first mathematical function and a second mathematical function.

23. The method of claim 15, wherein the first value and the second value are constrained to be outside of a region between a first mathematical function and a second mathematical function.

\* \* \* \* \*

UNITED STATES PATENT AND TRADEMARK OFFICE
CERTIFICATE OF CORRECTION

| | | |
|---|---|---|
| PATENT NO. | : 7,873,917 B2 | Page 1 of 1 |
| APPLICATION NO. | : 11/271081 | |
| DATED | : January 18, 2011 | |
| INVENTOR(S) | : Eric Larsen et al. | |

It is certified that error appears in the above-identified patent and that said Letters Patent is hereby corrected as shown below:

On the Title page, in field (74), in column 2, under "Attorney, Agent, or Firm", line 1, delete "Tolen" and insert -- Tollen --, therefor.

In column 1, line 38, after "in" insert -- the speed would make a change in --. (2nd occurrence)

In column 1, line 40, delete "users" and insert -- user --, therefor.

In column 1, line 44, delete "application" and insert -- applications --, therefor.

In column 11, line 48, delete "manipulated" and insert -- manipulated. --, therefor.

In column 11, line 50, after "be" insert -- moved --.

In column 11, line 53, before "invention" insert -- present --.

In column 11, line 54, delete "embodiment" and insert -- embodiments --, therefor.

In column 11, line 55, delete "detail," and insert -- details, --, therefor.

In column 11, line 61, delete "claim." and insert -- claims. --, therefor.

Signed and Sealed this
Twenty-fifth Day of October, 2011

David J. Kappos
*Director of the United States Patent and Trademark Office*